Aug. 2, 1960 G. J. SHAW 2,947,132
WHEEL ADJUSTMENT AND DRIVING IN A POWER MOWER OR THE LIKE
Filed Feb. 4, 1957 4 Sheets-Sheet 2

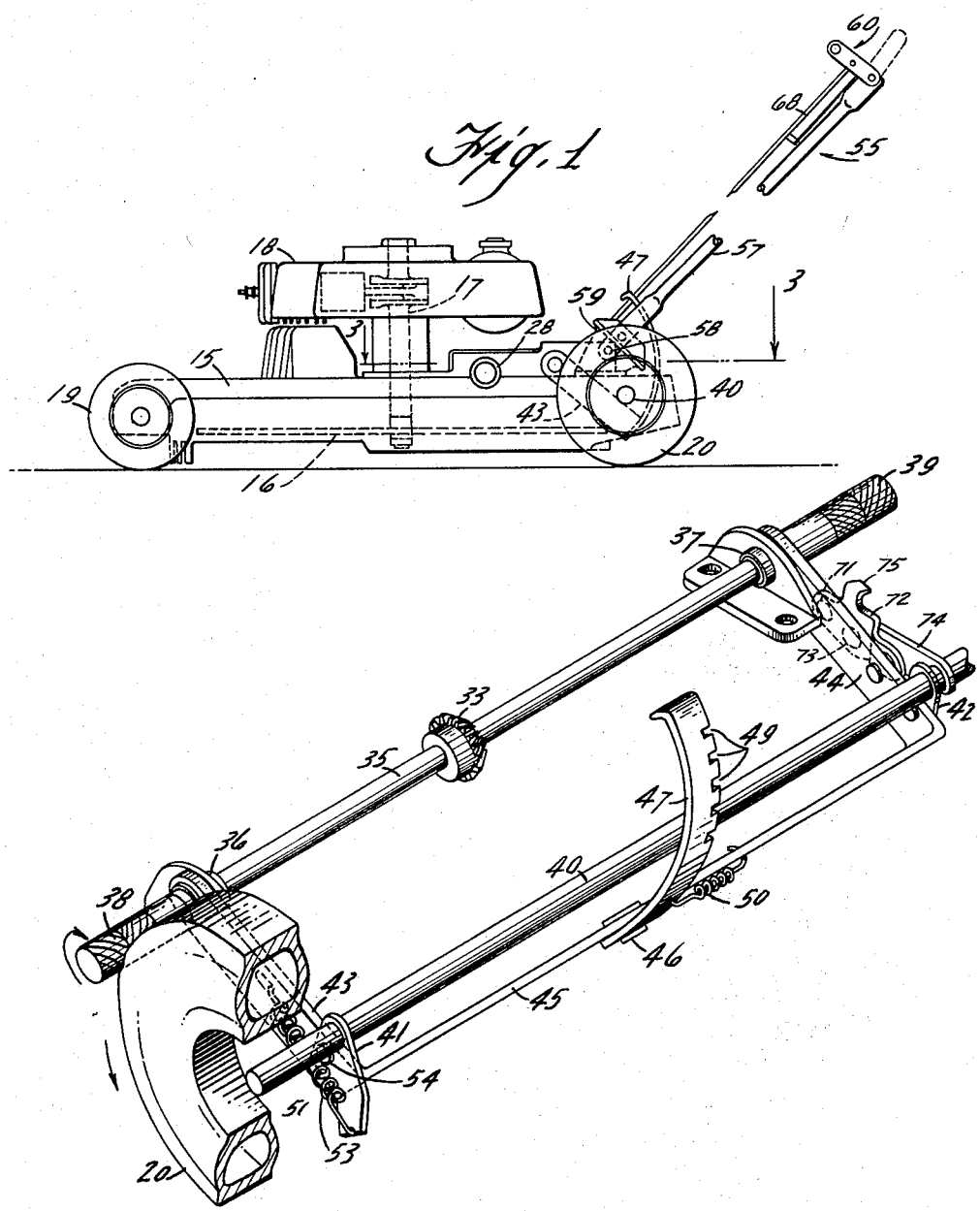

INVENTOR.
GERALD J. SHAW
BY
Wheeler, Wheeler & Wheeler
ATTORNEYS

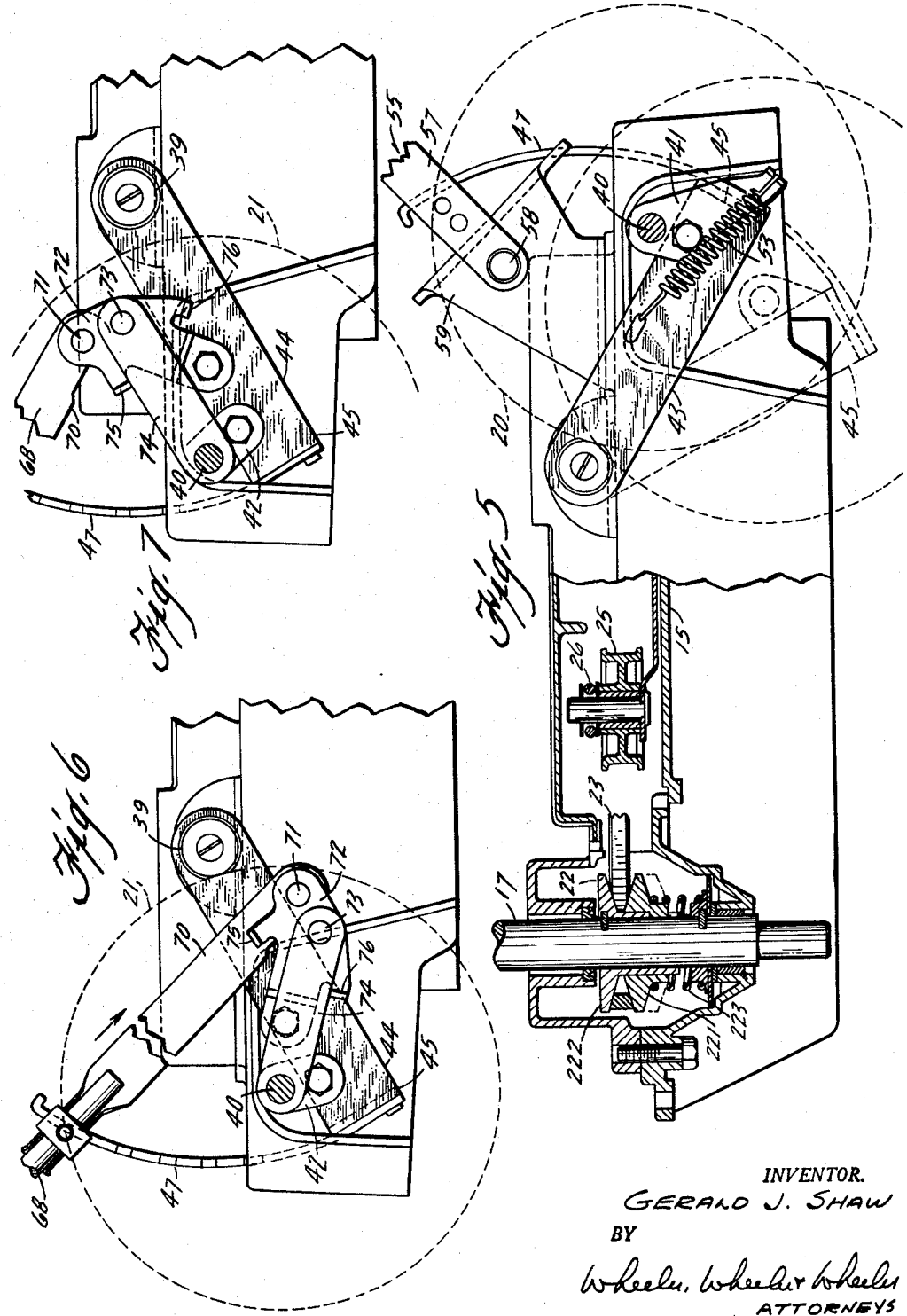

Aug. 2, 1960   G. J. SHAW   2,947,132
WHEEL ADJUSTMENT AND DRIVING IN A POWER MOWER OR THE LIKE
Filed Feb. 4, 1957   4 Sheets-Sheet 4
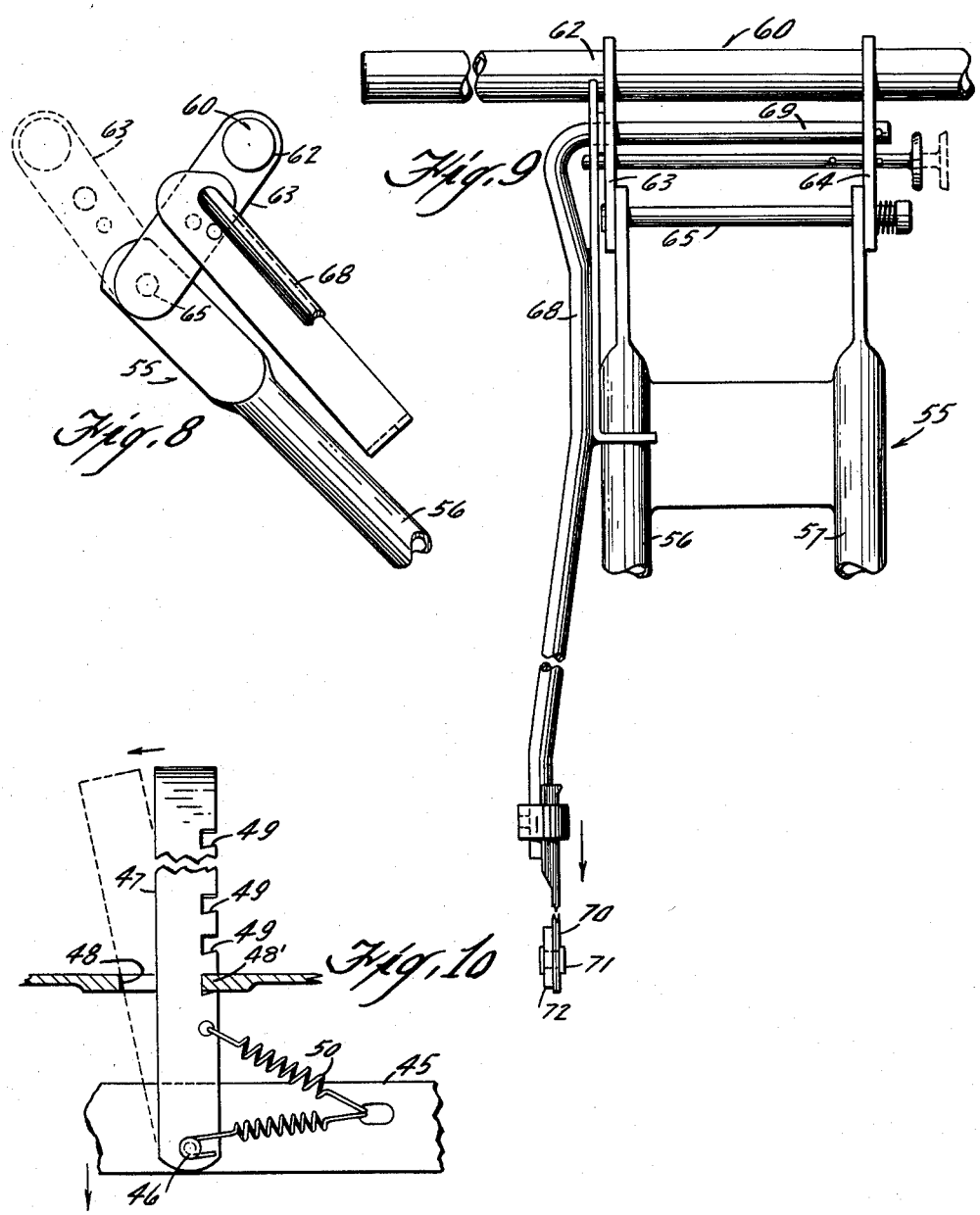
INVENTOR.
GERALD J. SHAW
BY
Wheeler, Wheeler & Wheeler
ATTORNEYS

United States Patent Office 2,947,132
Patented Aug. 2, 1960

2,947,132

WHEEL ADJUSTMENT AND DRIVING IN A POWER MOWER OR THE LIKE

Gerald J. Shaw, Lamar, Mo., assignor to Outboard Marine Corporation, Waukegan, Ill., a corporation of Delaware Filed Feb. 4, 1957, Ser. No. 638,051

10 Claims. (Cl. 56—25.4)

This invention relates to wheel adjustment and driving in a power mower or the like.

The invention is disclosed in connection with a power mower of the type having a vertical drive shaft and rotary blades of the sickle type mounted directly thereon. A belt is used to take power from this shaft for wheel driving purposes. The belt may be adjusted to varying degrees of tension with respect to its driven pulley for controlling the relative rate at which the wheels will be driven to propel the mower. The driven pulley is gear connected with a drive shaft at the ends of which there are rollers knurled for frictional driving engagement with the tires of the drive wheels of the mower.

The wheel axles are lever mounted to permit the wheels to be moved concurrently in a direction toward and from engagement with the knurled driving rolls. These levers are linked to a control handle pivotally mounted at the upper end of the handle which is used to guide the mower. The control handle is movable in a fore and aft direction upon its pivot, and the linkage is such that when the control handle is pushed forwardly with respect to the guiding handle, the propelling wheel of the mower is engaged with the driving rollers to receive power. A rearward pull on the control handle will disengage the wheels from the driving rollers. Thus, the power operation of the driving wheels follows the movement of the operator. If he moves forwardly, the mower is propelled forwardly. If he stops, the propulsion of the mower is also stopped automatically.

The levers which carry the propelling wheels for fore and aft movement to and from engagement with the driving rolls are also mounted for bodily movement in a generally vertical direction to adjust the height of cut. This adjustment is effected without in any way changing the operation of the automatic control of driving engagement of the wheels with the driving rolls. It will be understood that the front wheels are independently adjustable conventionally.

In the drawings:

Fig. 1 is a side elevational view of a mower equipped with controls embodying the invention.

Fig. 2 is an enlarged fragmentary detail view in perspective showing the mounting of the wheels for height adjustment and movement to and from engagement with the driving rolls.

Fig. 5 is a view taken in section on the line 5—5 of Fig. 3.

Fig. 6 is a view taken in section on the line 6—6 of Fig. 3.

Fig. 7 is a view similar to Fig. 6 showing the parts in a different position of adjustment.

Fig. 8 is a fragmentary detail view in side elevation of the upper end of the mower handle showing the manner in which the control handle is mounted for movement relative to the guiding handle of the mower.

Fig. 9 is a fragmentary view in front elevation of the front end of the handle assembly.

Fig. 10 is a detail view taken in section on the line 10—10 of Fig. 3.

Figure 3:
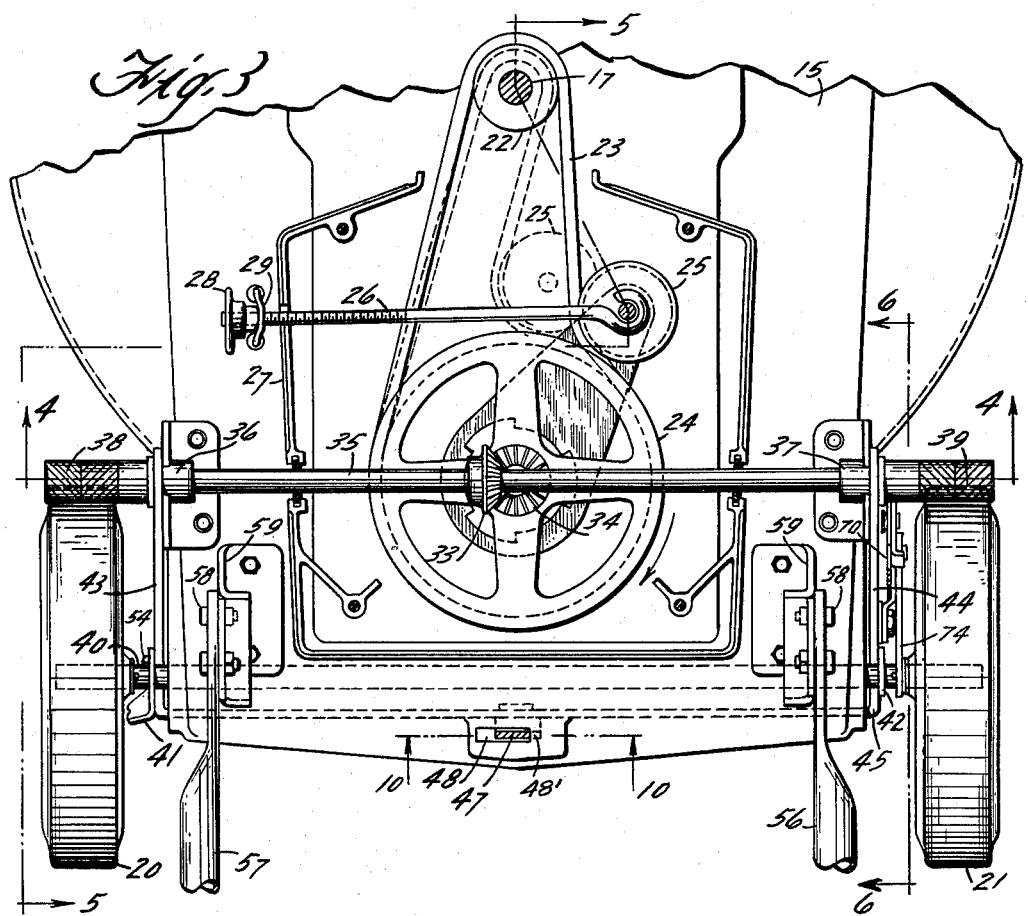
Fig. 3 is a view on an enlarged scale taken in section on the line 3—3 of Fig. 1.
Figure 4:
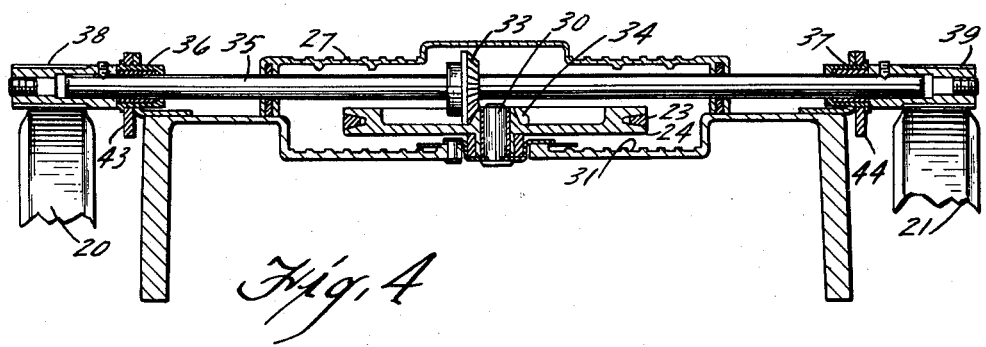
Fig. 4 is a view taken in section on the line 4—4 of Fig. 3.

The mower is of a well-known design comprising a downwardly opened housing 15 in which the rotary sickle type blades 16 are mounted on the upright drive shaft 17 powered by a prime mover such as engine 18. The housing has forward supporting wheels such as that shown at 19 in Fig. 1.

The present device differs from conventional in the manner in which the rear wheels 20 and 21 are mounted, driven, and controlled.

The vertical drive shaft 17 is provided with a power take-off pulley at 22 about which a belt 23 is trained to operate a driven pulley 24. An idler 25 controls the extent of wrap of belt 23 about the driven pulley 24. The idler is carried by a screw bolt 26 projecting laterally through the drive case 27 and equipped with a manually operable nut wheel at 28 which bears against bracket 29 for exerting tension on the idler pulley 25 for moving it from the relatively retracted position shown in full lines in Fig. 3 to the advanced position in which the pulley is shown in dotted lines in that view.

The pulley 22 is of the type which handles the belt at varying radius according to the tension on the belt. For this purpose, pulley 22 is made in two sections, the section 221 being urged toward the fixed section 222 by means of compression spring 223. As the tension of the idler is increased, the belt is wedged between the sections 221 and 222 of the driving pulley to spread these from the full line position of Fig. 5 to the dotted line position, thereby accommodating the belt at a reduced radius and changing the ratio of drive. The range of driving movement thus effected is sufficient to accommodate all desired speeds of the mower from minimum to maximum.

The stud shaft 30 upon which the driven pulley 24 is mounted may conveniently be supported in a well 31 in the mower housing 15. The casing 27 encloses the belt and pulley and also encloses the bevel gear 33 which meshes with bevel gear teeth at 34 with which the pulley 24 is provided. The gear 33 is mounted on a drive shaft 35 carried by bearings 36 and 37 from housing 15 and projecting laterally beyond the housing. At its ends, the shaft 35 is provided with knurled driving rollers at 38 and 39 to and from which the wheels 20 and 21 of the mower can be adjusted between driven and non-driven positions. The knurled rollers 38 and 39 are in constant operation during the operation of the shaft 17 of engine 18.

The wheels 20 and 21 are rotatable with respect to a supporting axle at 40 which is carried by levers 41 and 42 from the arms 43 and 44 of a yoke 45. The yoke arms 43 and 44 are externally pivoted upon the bearings 36, 37 within which the drive shaft 35 is mounted. Thus, the yoke is adjustable upon an axis which is the same as the axis of shaft 35. Pivoted centrally at 46 to the yoke is a positioning detent lever 47 which extends through a slot 48 in housing 15 and is marginally notched at 49 for selective engagement at different levels with the margin 48' of the housing at one side of notch 48. (See Figs. 2, 3, and 10.)

By pivoting the detent lever 47 to disengage it from the housing, the lever may be used to position the yoke and the wheel axle shaft 40 at any desired level of the wheels respecting the housing to vary the depth of cut of the rotor blades 16 of the mower. Movement of the lever to the right as viewed in Fig. 10 will re-engage its notched margin with the housing to secure the wheels in the desired position of height adjustment of the housing. The spring 50 subjects the detent lever 47 to a bias tending to maintain it in engagement to hold the adjustment thus achieved. This provides an extremely simple, effective, and easily operable control of depth of cut.

A very substantial range of movement is appropriate because of the fact that the cutting is done largely at the front side of the path of rotor rotation, and this is proximate the front wheels 19 of the mower. Accordingly, a relatively large adjustment of the rear wheels effects a relatively slight height adjustment of the path of the cutter blades adjacent the front wheels of the mower. It is intended that the front wheels will normally be adjusted in conventional manner at the same time the rear wheels are adjusted. However, the arrangement disclosed is such that for some purposes the depth of cut may be varied without adjusting the front wheels.

The links 41 and 42 upon which the wheel axle 40 is mounted project upwardly from the yoke to accommodate relative fore and aft movement of shaft 40 and wheels 20 and 21 to engage the wheels with the knurled drive rollers 38 and 39 and disengage the wheels therefrom. At least one of these links, as link 41 in Fig. 2, is extended rearwardly and laterally to provide an anchorage for a tension spring 53, the fixed end of which is anchored to the arm 43 of yoke 45.

The leverage of spring 53 is always exerted in a direction tending to disengage the drive to the wheels. However, in normal forward operation, the spring is proximate the link fulcrum 54, so that the disengaging force exerted by the spring is relatively small. When the wheels are moved away from the drive rollers 38 and 39, the mechanical advantage of the spring 53 is increased so that the spring exerts its maximum disengaging force to hold the drive disengaged.

The mower is provided with a guiding handle 55 which, as best shown in Fig. 9, comprises a pair of cross connected laterally spaced bars 56 and 57. These are pivoted to studs 58 provided by bracket means 59 as indicated in Figs. 1, 3 and 5. As is conventional, the guiding handle has limited upward and downward movement about the studs 58 for the convenience of operators of different height and to accommodate movement of the mower housing with respect to the handle due to irregularities of the ground traversed.

A novel feature of the present mower consists in the provision of a control handle 60 which is capable of limited independent movement respecting guide handle 55. The control handle 60 comprises a transverse bar 62 mounted on links 63 and 64 which are pivoted on a cross shaft 65 at the upper end of the guiding handle 55. The oscillatory movement of the control handle 60 with respect to guiding handle 55 is used to transmit motion through a link at 68 which has an integral end portion 69 extending through levers 63 and 64 to provide a fulcrumed connection between these parts. Thus, movement of the control handle 60 from the full line position of Fig. 8 to the dotted line position thereof will retract the link 68 upwardly along the guiding handle 55, while a reverse movement of the control handle from its rearward to its forward position will advance the link 68 longitudinally of the guiding handle 55 of the mower.

At its lower end, the actuating link 68 has an extension at 70 in pivotal connection at 71 with a compound lever which comprises a lever 72 pivoted at 73 to another lever 74 which is pivotally mounted directly upon the axle shaft 40 as best shown in Figs. 6 and 7. The lever 72 has stop arms at 75 and 76 limiting it to a range of pivotal movement respecting lever 74 as shown in the two positions illustrated in Figs. 6 and 7. Fig. 6 shows stop arm 76 engaged with lever 74 while Fig. 7 shows stop arm 75 engaged with lever 74.

When the forward relative movement of the control handle 60, with respect to the guiding handle 55, effects a longitudinal advance of control link 68 along the guide handle, the effect is to move the lever system to the position illustrated in Fig. 6, in which position the axle 40 is advanced to engage the wheels 20 and 21 with the driving rolls 38 and 39. Lever 72 and lever 74 make up an over-center device to keep the tires positively held against the rollers, while in the engaged position. The compression of the tire on the rollers provide the locking force.

A converse relative movement of the control handle rearwardly respecting the guiding handle will adjust the parts to the position shown in Fig. 7, the axle 40 being now retracted to disengage the wheels from the driving rolls. The retracting movement is effected by pivoting levers 72, 74 across center, whereupon the spring 53 will hold the wheels 20 and 21 disengaged from drive rollers 38, 39. Thus, if the operator advances with his hand in contact with the control handle, he automatically effects engagement of the wheels to receive power, whereupon the mower advances at the same speed he does. If he stops, or if the mower tends to advance more rapidly than the operator, in either case, the relative retractive tension on the control handle will disengage the wheels from the driving rolls.

I claim:

1. In a device of the character described, the combination with a chassis and driving wheels and a drive shaft mounted on the chassis and having friction driving rolls with which the wheels are peripherally engageable, with wheel mounting means upon which the wheels are bodily movable to and from the rolls, in further combination with a guiding handle for the chassis, means on the handle for moving the wheels to and from roll engagement, a motion transmitting connection from said last means to the wheel mounting means, said connection being adapted to transmit a forward relative motion of said last mentioned means to engage the wheels with the driving rolls and a rearward relative movement of the last mentioned means to disengage the wheels from the driving rolls, the motion transmitting connection comprising an overcenter lever device locked by reaction pressure of the wheels and rolls to maintain pressure engagement between said wheels and rolls in a relatively forward position of the control handle, and a spring biasing said wheels toward a position of disengagement from said rolls at a relatively rearward position of the control handle.

2. In a device of the character described, the combination with a chassis having front and rear wheels and a mowing device intermediate said wheels, of means for varying the cut of the mowing device including a mounting upon which all the wheels at one end of the chassis are carried for concurrent movement vertically respecting the chassis, a drive shaft having wheel-driving rollers, the said mounting having lever portions pivoted substantially coaxially with said shaft, and a single detent member connected with the wheel mounting between the wheels and having a portion guided for movement respecting the chassis and selectively engageable with the chassis in a plurality of positions of adjustment of the said mounting and wheels.

3. The device of claim 2 in which the levers comprise the legs of a yoke, the wheels having a mounting axle supported from said legs and the said member comprising a marginally notched member connected centrally with the yoke, the chassis having means selectively engageable in the several notches of the member, and the member being subject to bias in a direction to maintain such engagement.

4. In a device of the character described, the combination with a chassis having front and rear wheels and provided with means requiring height adjustment, of an axle upon which the wheels are mounted, a yoke having arms pivotally connected with the chassis, means adjustably connecting the yoke with the chassis for determining the level of the axle respecting the chassis, the axle being provided with means connecting it with said yoke, a drive shaft mounted on the chassis and provided with at least one roller for peripheral engagement with a wheel of said axle, the drive shaft axis being at least approximately coaxial with the pivotal connection of the yoke with the chassis, and means mounting the axle on the yoke arms for movement toward and from the drive shaft, the drive shaft having said roller portion with which a wheel is engaged in one position of the axle and from which said wheel is disengaged in another position of the axle.

5. The device of claim 4 in further combination with a handle connected with the chassis and provided with means for effecting movement of the axle between said positions.

6. The device of claim 5 in which the means supporting the axle for forward and rearward movement between said positions comprises levers pivoted to the arms of said yoke and upon which the axle is mounted, the means for effecting axle movement comprising a control handle mounted on the handle first mentioned and having a linkage connecting it with one of said levers.

7. In a power mower, the combination with a chassis provided with front and rear wheels and requiring height adjustment, of an engine mounted on the chassis, a drive shaft having a powered connection with the engine to receive motion therefrom, means for engaging one of the chassis wheels with the drive shaft to rotate the wheel, and means mounting said last mentioned wheel for vertical adjustment respecting the chassis and for accommodating said adjustment without affecting the driving relationship between the shaft and wheel, the shaft having a driving portion with which the adjustable wheel is peripherally engageable, the said wheel having a supporting arm pivotally connected with the chassis substantially coaxial with the drive shaft.

8. The device of claim 7 in further combination with means supporting the last mentioned wheel for movement in a direction generally longitudinal respecting said arm between a position of engagement between said wheel and said drive shaft portions, and another position of relative disengagement.

9. A power mower comprising the combination with a chassis having front and rear wheels and an intermediate generally upright drive shaft and a rotary mower mounted on said shaft between the wheels, an engine powering said shaft, a driving pulley on said shaft, a driven pulley behind the shaft, means operatively associated with the pulleys for varying the driving ratio between the pulleys, a transverse power shaft having driven connections with the driven pulley and provided with wheel engageable rolls adjacent its ends, a yoke having a pivotal connection with the chassis substantially coaxial with the power shaft, an adjustable connection between the yoke and chassis, an axle carried by the yoke to partake of the adjustment of the yoke with respect to the chassis, two of the aforesaid chassis wheels being mounted on the axle, whereby the adjustment of the yoke varies the height of support of one end of the chassis respecting said wheels, means carrying the axle from the yoke for accommodating relative forward and rearward movement of the axle respecting the yoke, the wheels being so disposed on said means that in a forward position of the axle, the peripheries of the wheels will engage the roll portions of the power shaft to receive motion therefrom, the wheels being disengaged from the power shaft in another position of the axle, and means operatively associated with the axle for controlling the position of said forward and rearward movement of the axle to effect driving connection and disconnection of said wheels and power shaft.

10. The device of claim 9 in which the last mentioned means comprises a guiding handle connected with the chassis, a control handle pivoted to the guiding handle and having a portion movable relatively forwardly and rearwardly respecting the guiding handle, and motion transmitting connections from the control handle to the axle for effecting movement thereof to engage the wheels with the power shaft when the control handle is moved forwardly, and for effecting release of the wheels from the power shaft when the control handle is moved rearwardly.

References Cited in the file of this patent

UNITED STATES PATENTS

| | | |
|---|---|---|
| 2,247,333 | Funk | June 24, 1941 |
| 2,604,747 | Bash | July 29, 1952 |
| 2,623,603 | Cutlan et al. | Dec. 30, 1952 |
| 2,691,421 | Swanson | Oct. 12, 1954 |
| 2,706,879 | Barrentine | Apr. 26, 1955 |
| 2,708,484 | Hoffman | May 17, 1955 |
| 2,722,432 | Roberton et al. | Nov. 1, 1955 |
| 2,730,374 | Rogers et al. | Jan. 10, 1956 |
| 2,736,389 | Phelps | Feb. 28, 1956 |
| 2,740,246 | Smith et al. | Apr. 3, 1956 |
| 2,771,959 | Phelps | Nov. 27, 1956 |
| 2,824,415 | Frazier | Feb. 25, 1958 |
| 2,836,430 | Langenbacher | May 27, 1958 |